United States Patent [19]

Rice et al.

[11] Patent Number: 4,842,013
[45] Date of Patent: Jun. 27, 1989

[54] DROOP COMPENSATED DIRECT ACTING PRESSURE REGULATOR

[75] Inventors: Donald D. Rice, Wylie; Mark E. Hood, Allen, both of Tex.

[73] Assignee: Fisher Controls International, Inc., Marshalltown, Iowa

[21] Appl. No.: 161,860

[22] Filed: Feb. 29, 1988

[51] Int. Cl.⁴ ................... G05D 16/06; F16K 31/524
[52] U.S. Cl. ............................ 137/484.4; 137/505.46; 251/263
[58] Field of Search ............. 137/484.2, 484.4, 505.46, 137/505.47; 251/263

[56] References Cited

U.S. PATENT DOCUMENTS

| | | | |
|---|---|---|---|
| 409,627 | 8/1889 | Bell . | |
| 468,915 | 2/1892 | Kraiss | 137/505.46 |
| 578,297 | 3/1897 | Sharpneck et al. . | |
| 1,839,980 | 1/1932 | Luchs et al. . | |
| 1,874,680 | 8/1932 | Wolfe | 137/505.46 |
| 1,893,254 | 1/1933 | Sweeney | 137/505.46 X |
| 1,934,832 | 11/1933 | Temple | 137/505.47 X |
| 2,102,007 | 12/1937 | Kimball | 121/41 |
| 2,373,268 | 4/1945 | Shelly | 251/263 X |
| 2,499,318 | 2/1950 | Jungerhans | 251/263 X |
| 3,156,174 | 11/1964 | Replogle | 98/1.5 |
| 3,207,175 | 9/1965 | Pauly | 137/505.46 |
| 3,242,938 | 3/1966 | Smilg | 137/505.46 X |
| 4,297,998 | 11/1981 | Christianson et al. | 128/204.26 |
| 4,491,149 | 1/1985 | Trinkwalder | 137/505.46 |
| 4,549,719 | 10/1985 | Baumann | 251/280 |
| 4,665,945 | 5/1987 | Suzuki | 137/613 |

FOREIGN PATENT DOCUMENTS

| | | | |
|---|---|---|---|
| 51956 | 2/1889 | Fed. Rep. of Germany | 137/505.46 |
| 53637 | 2/1889 | Fed. Rep. of Germany | 137/505.46 |
| 1921331 | 12/1977 | Fed. Rep. of Germany | 341/251 |
| 1081286 | 12/1954 | France | 15/2 |
| 688735 | 3/1953 | United Kingdom | 137/505.46 |

OTHER PUBLICATIONS

Fisher Controls Publication—R322 Integral Two-Stage Regulators—Apr. 1985.
Fisher Controls Publication—R922 Single or Second Stage Regulators—Apr. 1985.
Fisher Controls Publication—R352 Second Stage Regulators—Apr. 1985.
Fisher Controls Publication—S100 and S102 Pressure Regulators—Jul. 1984.

*Primary Examiner*—Stephen Hepperle
*Attorney, Agent, or Firm*—Dale A. Kubly; Nicholas A. Camasto; Arnold H. Cole

[57] ABSTRACT

A self-operated droop compensated regulator includes a spring casing and a lower casing, sandwiching a diaphragm. The lower casing has axially aligned inlet and outlet ports. A one piece cam stem and relief seat is mounted for movement with the diaphragm and includes a first cam surface for directly engaging a movable disk holder. The disk holder is movable in a straight line within an orifice tube that supports the valve seat. The cam surface moves the disk holder at a nonlinear rate with respect to the diaphragm. The orifice tube has an extension for providing a boost action to the diaphragm. A pressure relief mechanism is incorporated within the upper portion of the diaphragm. A bias spring acts, between a second similar cam surface on the opposite side of the stem and the disk holder, to maintain the first cam surface in contact with the disk holder.

10 Claims, 4 Drawing Sheets

DROOP COMPENSATED DIRECT ACTING PRESSURE REGULATOR

BACKGROUND OF THE INVENTION AND PRIOR ART

This invention relates generally to gas pressure diaphragm regulator valves and particularly to a gas pressure regulator valve that is usable for both natural gas and liquified petroleum gas (LP or propane) service.

Gas pressure diaphragm type regulator valves are well-known in the art. In such valves, a valve disk and a mating seat assembly are positioned intermediate to an upstream and a downstream portion of a flowpath for controlling downstream pressure and gas flow by varying the valve opening, that is, the amount by which the valve disk is displaced from its associated valve seat. Gas pressure and flow regulation are achieved by modulating the valve opening to maintain the required downstream pressure while delivering the quantity of gas demanded by the load. The popular, low cost, single stage regulator valve includes a diaphragm that acts as both the measuring and the actuation device with the downstream pressure being applied to one side of the diaphragm against the force of an opposed, adjustable regulator spring. The spring force initially holds the diaphragm and the attached stem linkage mechanism in such a position so as to have retracted the valve disk from the valve seat. As upstream pressure is introduced, gas flow occurs through the seat to the disk opening and into the downstream side of the device. The downstream pressure force is applied against the diaphragm and enables the diaphragm to overcome the opposing regulator spring force thereby moving the stem linkage and the valve disk to a position closer to the valve seat. In this manner, the adjustment of the regulator spring loading determines the downstream control pressure as a force equilibrium is achieved between the loading force of the spring and the force on the diaphragm from the downstream pressure. The linkage mechanism provides a mechanical advantage which enables a small diaphragm actuated by very low downstream control pressures to close the valve disk against the valve seat despite the relatively high pressure acting to push the disk open.

All single stage regulator valves experience so-called "droop" in their pressure flow characteristic. Droop is caused by two factors, one being the small change in the force exerted by the regulating spring due to changes in its length during travel of the diaphragm, and the other because the effective area of the diaphragm changes slightly as the diaphragm moves. These effects combine to lower the downstream control pressure with flow increases. Hence the pressure is said to "droop." A relatively simple, inexpensive and effective partial solution is to use "velocity boosting" to apply a slightly lower pressure than the controlled downstream pressure to the diaphragm. The effect is to cause a larger valve opening and greater gas flow rates. Velocity boosting can be accomplished by a pitot tube that is positioned to sense the lower pressure at the vena contracta of the valve or by a boost tube to develop a lower pressure with increased velocity of flow in the valve chamber that communicates with the diaphragm. Other techniques for aspirating the chamber to reduce the effective pressure below that of the controlled downstream pressure are also contemplated.

It will be appreciated that in domestic gas service, the downstream pressure must be maintained at an extremely low level, on the order of 7 to 11 inches of water column pressure for natural gas and LP gas service, respectively, whereas the inlet or upstream pressure may be on the order of 60 psi or more. Good pressure relief operation is required to preclude potentially serious over pressure conditions in the downstream system as well as to minimize annoying (and potentially dangerous) extinguishing of pilot lights in domestic appliances. However, the demands on gas pressure regulators, for domestic use in particular, are such that design compromises are required in the simple mechanical devices. For example, friction and hysteresis or backlash, inherent in linkage mechanisms, detract from the consistency of regulator performance. As mentioned, the spring effect and the diaphragm effect combine to cause output pressure droop. This droop will be overcome only at certain inlet pressures or across limited flow ranges by imprecise velocity boosting techniques. The fixed mechanical advantage linkage mechanisms do nothing to overcome droop. In many current examples of the art, the relief valve is contained in an actuator housing which is separated from the body that houses the valve seat, forcing overpressured downstream gas to flow through restricting passages before reaching the relief valve for venting.

The gas pressure regulator valve of the invention overcomes these limitations by utilizing a combination of a characterized cam stem and an orifice tube which is a valve seat with an integral boost tube. The characterized or contoured cam stem has a cam profile that is directly operable by the regulator spring and diaphragm for moving a valve disk in a straight line into and out of engagement with a valve seat in a nonlinear fashion, without the intervention of any linkage mechanism. The cam stem provides a high mechanical advantage when required to close the valve disk against the seat, yet exhibits a low mechanical advantage to achieve rapid, nonlinear opening of the valve disk to mechanically induce a boost effect and maintain the desired downstream control pressure in all flow situations. The orifice tube aids in the uniformity of regulation by inducing flow activated boost as its configuration determines the space between the end of the tube and the valve outlet which in turn controls aspiration of the diaphragm cavity, which is the downstream pressure measuring element of the regulator. The arrangement also permits the diaphragm to be exposed to a large volume flow chamber, and in conjunction with a large area relief seat on the cam stem, provides excellent over pressure protection or relief performance. The direct acting pressure regulator valve of the invention is thus suitable for either natural gas or LP gas service use by simply changing the predetermined, adjustable relief valve spring and regulator spring loads.

OBJECTS OF THE INVENTION

A principal object of the invention is to provide a novel gas pressure regulator valve.

Another object of the invention is to provide a low cost, high performance, direct acting, single stage gas pressure regulator valve.

A further object of the invention is to provide an improved single stage gas pressure regulator valve.

BRIEF DESCRIPTION OF THE DRAWINGS

These and other objects and advantages of the invention will be apparent upon reading the following description in conjunction with the drawings, in which:

FIG. 6 is an elevation view of the structure of FIG. 3.

DESCRIPTION OF THE PREFERRED EMBODIMENT

Figure 1:
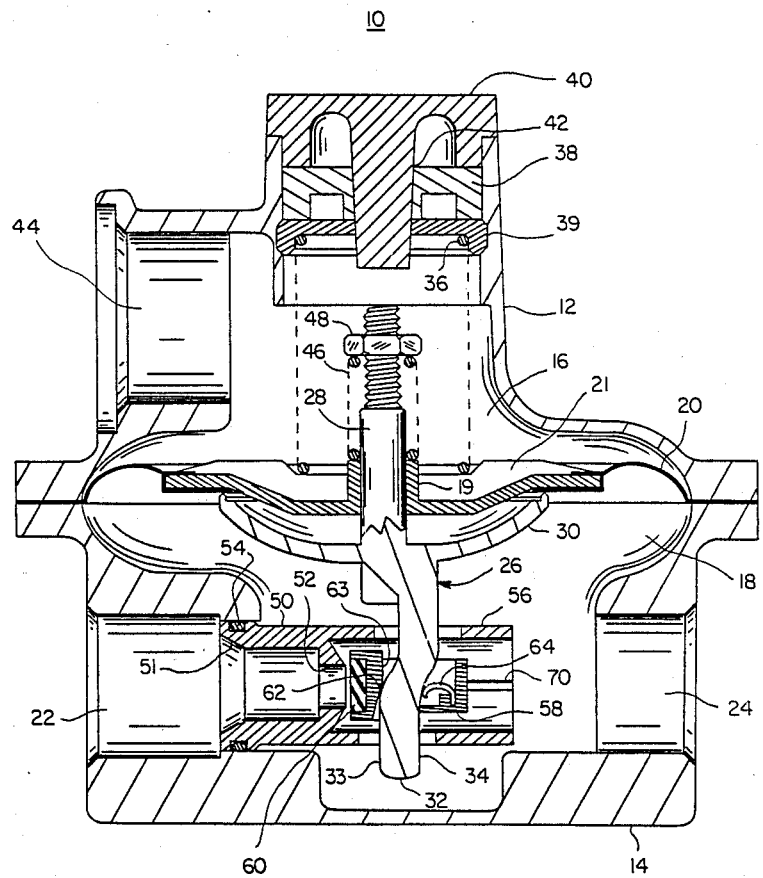
FIG. 1 is a cross section of a regulator valve constructed in accordance with the invention.
Figure 5:
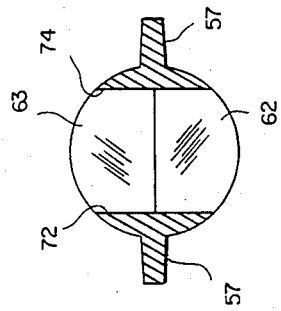
FIG. 5 is a partial view taken along line 5—5 in FIG. 2.
Figure 2:
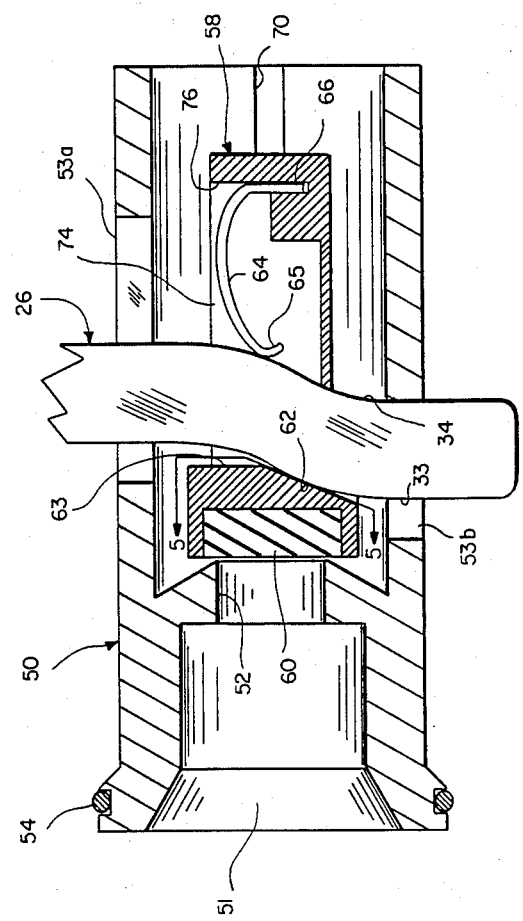
FIG. 2 is an enlarged partial showing of the characterized cam stem, boost tube and linearly movable disk holder of the inventive regulator valve.
Figure 3:
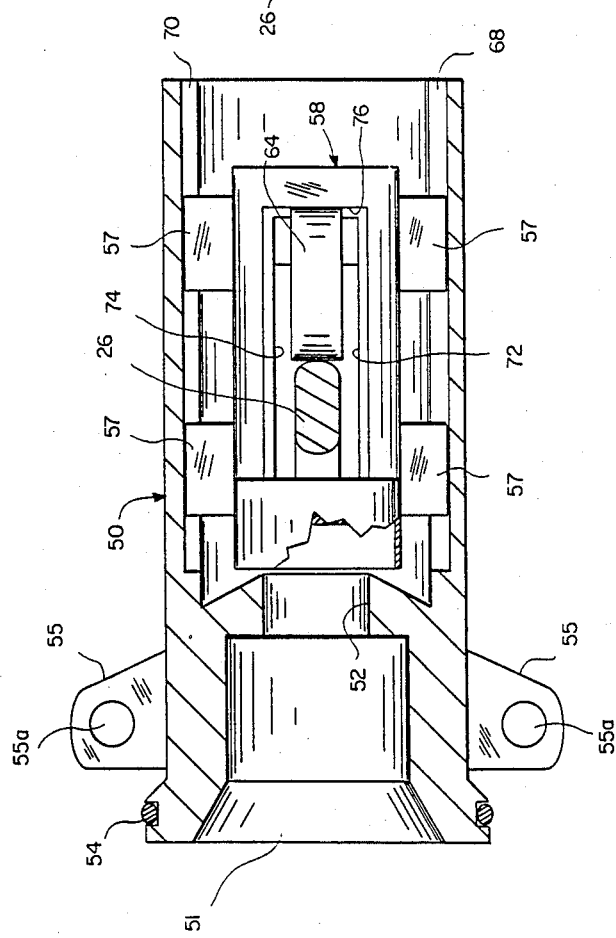
FIG. 3 is a top view of the arrangement of FIG. 2.
Figure 4:
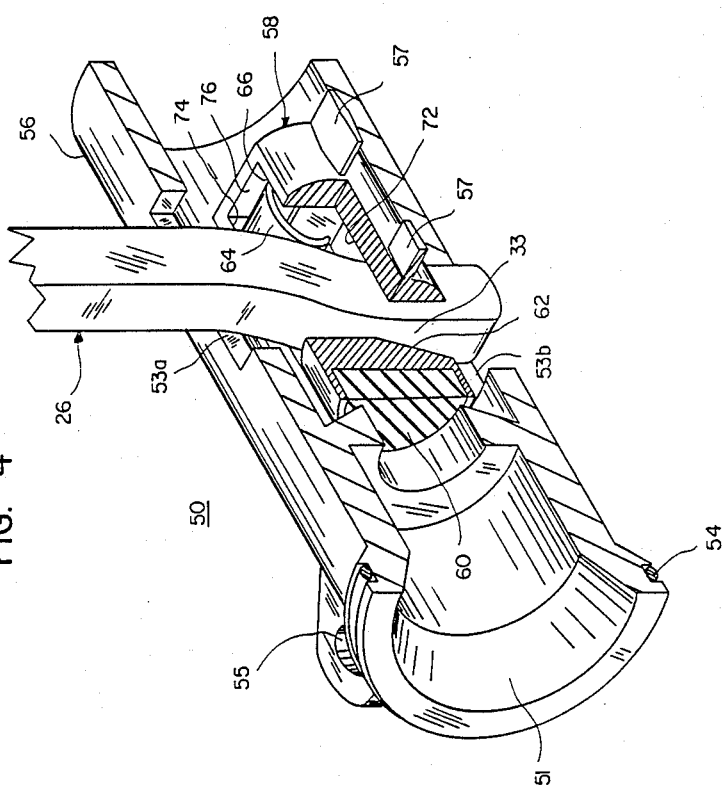
FIG. 4 is a partially cutaway perspective view of the arrangement of FIGS. 2 and 3.

Referring to FIG. 1, a regulator valve 10 includes a spring casing 12 that is assembled onto a regulator valve body or lower casing 14 by any conventional means. For example, the casings may include mating flanges along their peripheries that are secured together by suitable threaded fasteners and mating threaded apertures. These details are not illustrated. Spring casing 12 defines an upper chamber 16 and valve body 14 defines a lower chamber 18 of large volume. Separating these two chambers is an elastomeric, generally annular diaphragm 20 that is affixed to a large diameter diaphragm head 21. The circular, outer periphery of diaphragm 20 is captivated betwween the flanges of spring casing 12 and valve body 14. In any suitable manner, the inner peripheral portion of diaphragm 20 is affixed to the outer periphery of diaphragm head 21. Diaphragm head 21 has a centrally disposed, upstanding cylindrical collar 19. As will be appreciated by those skilled in the art, diaphragm head 21 is not solid, but defines a plurality of large apertures that in normal operation are sealed by a large area, generally cup-shaped, relief seat 30 that is an integral part of a cam stem 26. The relief seat may, of course, simply be affixed to cam stem 26. Cam stem 26 includes a cylindrical post 28 that terminates in a threaded end. Collar 19 of diaphragm head 21 is slidably mounted on post 28. Pressure is applied to seal the underside of diaphragm 20 with relief seat 30 by an adjustable relief spring 46 captivated between diaphragm head 21 and an adjustment nut 48 that threadingly engages the threaded end of post 28. Relief spring 46 is adjusted such that, for normal operating pressures, diaphragm head 21 does not move relative to cam stem 26 and consequently relief seat 30 remains in engagement with the underside of diaphragm 20.

When the diaphragm and relief seat are engaged, there is no path from valve body 14 to spring casing 12. When an over pressure condition exists such that diaphragm head 21 is driven upward with respect to cam stem 26, the seal between diaphragm 20 and relief seat 30 is broken and gas flow occurs from lower chamber 18 around relief seat 30 and through large orifices (not shown) in the body of diaphragm head 21, to upper chamber 16.

The upper portion of spring casing 12 is closed by a closing cap 40. An adjustable regulator spring 36 is captivated between diaphragm head 21 and an upper spring seat 39 that is vertically displaceable by turning an adjustment screw 38 for increasing or decreasing the force exerted by regulator spring 36 on the diaphragm head. Cap 40 includes a downwardly projecting travel stop 42 to limit the upward movement of cam stem 26 to force the regulator into relief operation in the event of catastrophic failure of the valve mechanism both to close in response to a cessation of gas demand and also to fail to relieve the resulting over pressure through normal relief operation. Spring casing 12 also defines a relief vent 44 by means of which upper chamber 16 communicates with the external environment.

Regulator valve body 14 includes an inlet port 22 and an outlet port 24 that are threadingly engageable for connection of the regulator valve in a pipeline (not shown) in which gas flows. Inlet port 22 and outlet port 24 are preferably axially aligned as shown to provide a relatively straight through flowpath for the gas in the pipeline. Cam stem 26 terminates in a stem end 32 having a front cam profile or surface 33 and a similarly contoured rear cam profile or surface 34. Stem end 32 extends through generally rectangular openings in a cylindrical orifice tube 50 having a length that extends over a substantial portion of the distance between inlet port 22 and outlet port 24. Orifice tube 50 is secured in valve body 14 and forms a gas tight seal with the inner wall of inlet port 22 by means of an O ring 54 and has a tapered portion 51 providing an entranceway thereto and forming a circular valve seat 52. Orifice tube 50 also has a boost extension 56 for providing a velocity boosting effect to gas flow therethrough to produce, by aspiration of the chamber by the flow velocity, a slightly lower pressure on the underside of diaphragm 20 than exists at outlet port 24. A valve disk 60 is carried by a disk holder 58 that is horizontally movable within orifice tube 50 in response to vertical movement of cam stem 26 at right angles thereto. This is accomplished by cam follower surfaces 62 and 63 on disk holder 58 that are engageable with front cam surface 33 on end 32. As will be seen with reference to the other figures, disk holder 58 is confined to straight line axial movement within orifice tube 50 by means of a pair of grooves in the orifice tube, one of which (70) is viewable in FIG. 1. A bias spring 64 engages rear cam surface 34 of stem end 32 and serves to overcome hysteresis effects in valve operation.

It should be noted that the underside of diaphragm 20 is substantially in direct communication with the flowpath that exists between inlet port 22 and outlet port 24. This arrangement, in conjunction with a large relief seat 30 on cam stem 26, enables fast, effective high pressure relief operation in the event of a sudden increase in outlet or downstream pressure, as described above. It should also be noted that the vertical movement of cam stem 26 is directly translated into straight line horizontal movement of valve disk 60 with respect to valve seat 52. There is no linkage mechanism, i.e., levers or pivots, to impose frictional losses or introduce mechanical play. Thus with the construction of the inventive arrangement, tight control over outlet pressure and flow, with excellent pressure relief, is achievable in a simple, low cost, direct operated regulator.

Reference to FIGS. 2-6 will reveal further construction details of the inventive arrangement. In the enlarged view of FIG. 2, the cutaway of disk holder 58 clearly shows valve disk 60, which is preferably constructed of a resilient material such as synthetic rubber, and maintained in a suitable recess in the forward end of disk holder 58. Disk holder 58 is generally cylindrical in shape with a cutout portion defining a pair of inner parallel side walls 72 and 74, a rear wall 76 and a forward wall defined by cam follower surfaces 62 and 63. Rear wall 76 extends into a groove 66 in which the end of bias spring 64 is secured so that its curved end 65 resiliently engages the rear cam profile 34 on stem end 32 of cam stem 26. Disk holder 58 has four extensions or wings 57, two on each side, that cooperate with a pair of diametrically opposed slots 68 and 70 in the inner surface of orifice tube 50 to confine disk holder 58 to straight line axial movement within the orifice tube. First and second mounting ears 55 are formed at the forward end of orifice tube 50 and include mounting apertures 55a for mounting the orifice tube securely within lower casing 14 of the regulator valve.

As shown, cam follower surfaces 62 and 63 are flat and angled with respect to each other. The cam follower surfaces cooperate with front cam profile 33 on cam stem 26 to move disk holder 58 and thereby control the flow opening between valve seat 52 and valve disk 60. The contour of cam profile 33 and the cam follower surfaces 62 and 63 provide approximately a 4:1 force advantage to facilitate firm closure of the valve disk when necessary, which tapers to approximately a 2:1 mechanical advantage to facilitate regulation stability and capacity during flow conditions.

As mentioned, the difficulty with hysteresis or mechanical backlash which results in variations in regulation under both upstream pressure and downstream load changes, is resolved with the construction of the invention by providing a similarly contoured cam profile 34 on the rear of end 32 of cam stem 26. Curved end 65 of bias spring 64 rides along cam profile 34 and continually urges cam surface 33 into engagement with the involved one of cam follower surfaces 62 and 63. This eliminates the hysteresis effect and contributes to the very consistent performance of the regulator with load cycling and inlet pressure changes.

The regulator is preferably constructed of lightweight but strong materials in keeping with its cost design objection. The cam stem, orifice tube and disk holder may be fabricated of engineering resins of inherently high self-lubricity or the like to provide lightweight, strength and low friction. The diaphragm may be fabricated from any well-known elastomeric materials utilized for such purposes. The cam stem and relief seat are preferably molded in a single piece. Similarly, the valve seat may be a separate insert or, as shown, integrally formed as part of the orifice tube. As should be apparent to those skilled in the art, changing the diameter of the orifice in valve seat 52 and the configuration of the cam surfaces as well as altering the length and size of orifice tube 50 will enable a manufacturer to provide single stage, low cost gas pressure regulator valves to meet a wide range of environmental and operating conditions.

It is recognized that numerous modifications in the described invention will be apparent to those skilled in the art without departing from its true spirit and scope. The invention is to be limited only as defined in the claims.

What is claimed is:

1. A droop compensated regulator valve having an inlet and an outlet comprising:
   diaphragm means;
   means applying a regulating force to one side of said diaphragm means;
   valve means coupled to said inlet and including an orifice tube, a valve seat and a movable valve disk means movable into and out of engagement with said valve seat;
   stem means coupled to said diaphragm means and having a cam profile for adjusting the position of said valve disk means with respect to said valve seat at a non linear rate responsive to movement of said diaphragm means;
   said orifice tube supporting said valve seat and including guide means, said movable valve disk means including a valve disk holder having a cam follower surface contacting said cam profile and a valve disk, and said guide means cooperating with said disk holder to restrict movement of said disk holder to straight line movement along the axis of said orifice tube;
   pressure relief means in direct flow communication with said orifice tube;
   boost means comprising an extension of said orifice tube communicating with said outlet for applying pressure to the other side of said diaphragm means; and
   bias means for maintaining said cam profile in contact with said cam follower surface.

2. The apparatus of claim 1 wherein said stem means includes a stem end defining said cam profile on one side thereof and defining a similar cam profile on the opposite side thereof; and wherein said bias means comprises a bias spring coupled between said disk holder and said similar cam profile for maintaining said cam profile in contact with said cam follower surface.

3. The apparatus of claim 2 wherein said guide means comprise a pair of diametrically opposed grooves in said orifice tube and wherein said disk holder includes a plurality of wing-like extensions cooperation with said grooves.

4. A droop compensated gas regulator valve comprising:
   a spring casing and a lower casing;
   a diaphragm interposed between said spring casing and said lower casing;
   adjustable spring means in said spring casing for loading one side of said diaphragm;
   a stem coupled to said diaphragm and having a a non linear cam profile extending into said lower casing;
   an inlet port and an outlet port in said lower casing in axial alignment;
   a valve seat positioned in said inlet port;
   a valve disk holder including support means;
   a valve disk carried by said valve disk holder;
   an orifice tube cooperating with said support means on said disk holder for supporting said valve disk holder for straight line movement for moving said valve disk into and out of engagement with said valve seat, said valve disk holder having a cross sectional area that is significantly smaller than the cross sectional area of said orifice tube to enable gas flow thereover; and
   means for directly coupling said cam profile on said stem to said valve disk holder.

5. The apparatus of claim 4, wherein said orifice tube has a boost extension positioned adjacent said outlet port for controlling pressure applied to the other side of said diaphragm.

6. The apparatus of claim 5, further including pressure relief means in said spring casing coupled to said diaphragm.

7. A droop compensated gas regulator valve comprising:

a spring casing and a lower casing;

a diaphragm interposed between said spring casing and said lower casing;

adjustable spring means in said spring casing for loading one side of said diaphragm;

a stem coupled to said diaphragm and having a contoured end extending into said lower casing;

an inlet port and an outlet port in said lower casing in axial alignment;

a valve seat positioned in said inlet port;

an orifice tube supporting said valve seat, said orifice tube having a boost extension positioned adjacent said outlet port for controlling pressure applied to the other side of said diaphragm;

means for mounting a valve disk for straight line movement into and out of engagement with said valve seat;

means for directly coupling said contoured end of said stem to said valve disk mounting means;

pressure relief means in said spring casing coupled to said diaphragm; and said movable valve disk means including a valve disk holder having extension wings and said orifice tube including a pair of opposed inner grooves cooperating with said extension wings.

8. The apparatus of claim 7 wherein said contoured end comprises a cam profile and wherein said disk holder includes a cam follower surface in contact with said cam profile, and further including a similar cam profile on the opposite side of said stem; and a bias spring coupled between said valve disk holder and said similar cam profile.

9. The apparatus of claim 8 wherein said cam profile imparts movement to said disk holder at a nonlinear rate responsive to said diaphragm means.

10. The apparatus of claim 9, further including pressure relief means in said spring casing coupled to said diaphragm and wherein said stem includes a large area relief seat coupled to said diaphragm.

* * * * *

UNITED STATES PATENT AND TRADEMARK OFFICE
CERTIFICATE OF CORRECTION

PATENT NO. : 4,842,013

DATED : June 27, 1989

INVENTOR(S) : Donald D. Rice and Mark E. Hood

It is certified that error appears in the above-identified patent and that said Letters Patent is hereby corrected as shown below:

Column 3, line 32, delete "betwween", insert --between--;

Column 6, line 34, delete "cooperation", insert --cooperating--.

Signed and Sealed this

Twelfth Day of June, 1990

Attest:

HARRY F. MANBECK, JR.

Attesting Officer

Commissioner of Patents and Trademarks